United States Patent [19]

Saxon

[11] Patent Number: 5,778,165
[45] Date of Patent: Jul. 7, 1998

[54] VARIABLE-LEVEL BACKUP SCHEDULING METHOD AND APPARATUS

[75] Inventor: Paul David Saxon, Auburn, Wash.

[73] Assignee: Digital Equipment Corporation, Maynard, Mass.

[21] Appl. No.: 546,006

[22] Filed: Oct. 20, 1995

[51] Int. Cl.$^6$ ............................................. G06F 11/16
[52] U.S. Cl. ................. 395/182.02; 395/620; 364/285.1
[58] Field of Search ......................... 395/182.02, 182.11, 395/489, 183.17, 620, 449; 364/285.1, 943.91, 966.2

[56] References Cited

U.S. PATENT DOCUMENTS

| | | | |
|---|---|---|---|
| 4,020,466 | 4/1977 | Cordi et al. | 395/617 |
| 4,077,059 | 2/1978 | Cordi et al. | 395/449 |
| 4,084,231 | 4/1978 | Capazzi et al. | 395/444 |
| 5,133,065 | 7/1992 | Cheffetz et al. | 395/181 |
| 5,239,647 | 8/1993 | Anglin et al. | 395/621 |
| 5,276,860 | 1/1994 | Fortier et al. | 395/182.04 |
| 5,276,867 | 1/1994 | Kenley et al. | 395/620 |
| 5,313,631 | 5/1994 | Kao | 395/620 |
| 5,379,412 | 1/1995 | Eastridge et al. | 395/250 |
| 5,381,545 | 1/1995 | Baker et al. | 395/575 |
| 5,423,018 | 6/1995 | Dang et al. | 395/486 |
| 5,446,884 | 8/1995 | Schwendemann et al. | 395/600 |
| 5,454,099 | 9/1995 | Myers et al. | 395/182.04 |
| 5,495,607 | 2/1996 | Pisello et al. | 395/610 |
| 5,537,585 | 7/1996 | Blickenstaff et al. | 395/621 |
| 5,559,991 | 9/1996 | Kanfi | 395/489 |
| 5,574,906 | 11/1996 | Morris | 395/601 |

FOREIGN PATENT DOCUMENTS

A-0 410 630   1/1991   European Pat. Off. .

OTHER PUBLICATIONS

Spicer Jim, Backing up the Network, Apr. 1994, pp. 66–68, IEEE Spectrum.

Grossman et al., Caching and Migration for Multilevel Persistent Object Stores, 1995, pp. 127–135, IEEE.

Levine, Morty, A Healthier Network, Jul. 1992, LAN Computing, V3, n7, p. 25(3).

IBM Technical Disclosure, vol. 34, No. 12, May 1997, NY, US, pp. 158–161, "Algorithm for determining an optimal backup strategy".

*Primary Examiner*—Robert W. Beausoliel, Jr.
*Assistant Examiner*—Scott T. Baderman
*Attorney, Agent, or Firm*—Christine M. Kuta

[57] ABSTRACT

The variable-level backup scheduling method employs a schedule in which backups are performed at set times but the level of backup performed is determined from the condition of the system at the time of backup. Under this method, user-supplied parameters stored in level-tables allow a determination of the appropriate level of backup to be performed. If the data in the scheduled level of backup has not been modified in a sufficient amount under the supplied parameters, then the backup scheduling method determines whether a specified higher level backup is appropriate. If the evaluation of the higher level backup results in a determination that not enough data has been modified, the next level is evaluated. This process continues until the criteria for backup have been met or the level that has been predetermined to be the least amount of data to be saved has been reached.

15 Claims, 5 Drawing Sheets

LEVEL: | Sun | Mon | Tue | Wed | Thu | Fri | Sat
---|---|---|---|---|---|---|---
0 | 0 | 7 | 7 | 8 | 8 | 9 | 9
1 | 1 | 7 | 7 | 8 | 8 | 9 | 9
2 | 2 | 7 | 7 | 8 | 8 | 9 | 9
3 | 3 | 7 | 7 | 8 | 8 | 9 | 9
4 | 4 | 7 | 7 | 8 | 8 | 9 | 9

*Figure 3*

LEVEL: | pct | nbytes | age | nextlevel
---|---|---|---|---
0 | 50 | 1073741824000 | 355 | 1
1 | 25 | 536870912000 | 0xffffffff | 2
2 | 100 | 0xffffffffffffffff | 0 | -1

*Figure 8*

| LEVEL | pct | nbytes | age | nextlevel |
|---|---|---|---|---|
| 0 | 50 | 10737418200 | 355 | 1 |
| 1 | 100 | 0xffffffffffffffff | 0 | -1 |

*Figure 4*

| LEVEL: | Sun | Mon | Tue | Wed | Thu | Fri | Sat |
|---|---|---|---|---|---|---|---|
| 0 | 7 | 7 | 8 | 8 | 9 | 9 |
| 2 | 7 | 7 | 8 | 8 | 9 | 9 |
| 3 | 7 | 7 | 8 | 8 | 9 | 9 |
| 4 | 7 | 7 | 8 | 8 | 9 | 9 |
| 5 | 7 | 7 | 8 | 8 | 9 | 9 |

*Figure 5*

| LEVEL | pct | nbytes | age | nextlevel |
|---|---|---|---|---|
| 2 | 100 | 0xffffffffffffffff | 0 | -1 |
| 3 | 100 | 0xffffffffffffffff | 0 | -1 |
| 4 | 100 | 0xffffffffffffffff | 0 | -1 |
| 5 | 100 | 0xffffffffffffffff | 0 | -1 |
| 6 | 100 | 0xffffffffffffffff | 0 | -1 |
| 7 | 100 | 0xffffffffffffffff | 0 | -1 |
| 8 | 100 | 0xffffffffffffffff | 0 | -1 |
| 9 | 100 | 0xffffffffffffffff | 0 | -1 |

*Figure 6*

VARIABLE-LEVEL BACKUP SCHEDULING METHOD AND APPARATUS

FIELD OF THE INVENTION

This invention relates generally to computer systems, and more particularly to performing efficient data backups on computer systems.

BACKGROUND OF THE INVENTION

In a computer system, it is important that the data structure and content can be rebuilt in the event of a system failure. In order to accomplish this, a copy of the data, called a backup copy, is made. The backup copy is generally made on a medium, such as computer tape, which is stored away from the computer system. When the system fails, the data needed to bring the system back up can be restored from the backup copy.

Generally, multiple levels of backup copies are made over time to provide efficient protection of a computer system. A full level backup, which copies all the data in the system, is made only occasionally because a full level backup is lengthy and interrupts system operation. Partial backups, in which only some files are copied, are performed more frequently. Each volume of copied data is called a save set. In a multiple level backup method, the present or near-present state of the computer system is typically stored in a collection of many save sets composed of a full level backup and many partial backups. Potentially, all of these save sets must be installed into the computer for a complete restoration of the system. While multiple level backup method efficiently saves system data, restoring the system after failure can be a long process if a large number of save sets must be used.

Data backups are usually scheduled for times when the system is most quiescent and the backup will be less likely to interfere with normal processing. Some current multiple level backup methods simply perform full backups at fixed predefined times regardless of whether the majority of the data has been modified since the last full backup. The data is simply copied again in order to coalesce data for recovery into fewer save sets, thereby keeping the number of save sets manageable and reducing the amount of time needed to perform a full recovery in the case of full system failure. A constraining factor in the length of time between each full backup is the number of tapes required for a full recovery of all data. The more backup tapes that have to be located and mounted for a full recovery of the system, the longer that recovery will take. Even partial recoveries of specific files can be lengthy if the files to be recovered are spread over too many tapes. As the size of a file system increases, the amount of time to produce a full backup increases. This often leads to scheduling full backups, and even partial backups of more than one day's work, further and further apart.

In spite of the search for ways to decrease backup time, rigid schedules of backing up specific levels of data are adhered to for the following reasons: specific days and times of day when resources are most quiescent are determined and used so that backup does not interfere with regular processing any more than possible; rigid schedules enforce discipline, so that data is regularly and systematically backed up; and, rigid schedules enable automated initiation, further enforcing discipline and relieving human operators from the necessity to manually initiate backups.

The dilemma of efficient backups, where few full saves and many partial saves are performed, and efficient system recoveries, where many full saves and few partial saves are performed, is usually resolved in favor of backup time. It remains desirable to have a way to efficiently perform computer system backups so that recovery time is minimized in the event of failure of the computer system.

SUMMARY OF THE INVENTION

The problems of performing efficient, scheduled backups of data in a computer system are solved by the present invention of a variable-level backup scheduling method.

The variable-level backup scheduling method employs a schedule in which backups are performed at set times but the level of backup performed is determined from the condition of the system at the time of backup. Under this method, user-supplied parameters allow a determination of the appropriate level of backup to be performed. If the data in the scheduled level of backup has not been modified or deleted in a sufficient amount under the supplied parameters, then the backup scheduling method determines whether a specified higher level backup is appropriate. If the evaluation of the higher level backup results in a determination that not enough data has been modified, the next level is evaluated. This process continues until the criteria for backup have been met or the level that has been predetermined to be the least amount of data to be saved has been reached.

With variable-level backup scheduling, a determination is made as to how much data needs to be backed up. If enough data in the save set in question remains unmodified and therefore does not need to be replicated, a decision is made to backup less data, involving less time, less consumption of resources, and less impact to online operations on the data in question. For example, the variable-level backup scheduling method determines whether or not the time to recopy the unmodified data contained on the previous full backup is justified or not. If a full backup is not justified, some higher-numbered level will be performed that will involve copying less data and will take less time.

The variable-level backup scheduling method gives the ability to automatically adjust the normally-scheduled level to a different level, involving less data, with the decision being based upon user-supplied criteria. At the same time, this method stays within the time-constrained boundaries usually imposed by rigid schedules in that it never spends more time, copying more data than, anticipated. Rather, it often spends less time than anticipated, as it detects that lesser amounts of data are all that really needs to be re-copied.

The result will often be less time spent backing up data with the knowledge that the previous save sets contain enough unmodified data to justify their continued existence. Never is more data backed up than anticipated. When the previous save sets have reached a user-specified level of fragmentation or percentage of no longer relevant data, the normally scheduled level will be performed in its normal time slot.

For file systems in which a great percentage of the data is unused most of the time, this can greatly relieve time-constrained backups of any large system. For hierarchical storage systems, migrating huge amounts of data from more expensive and faster storage to less expensive and slower storage, this can be of even greater significance.

BRIEF DESCRIPTION OF THE DRAWINGS

The present invention together with the above and other advantages may best be understood from the following detailed description of the embodiments of the invention illustrated in the drawings, wherein:

FIG. 3 is an exemplary backup schedule;

FIG. 4 is an exemplary level-table for level 0;

FIG. 5 is a second exemplary backup schedule;

FIG. 6 is an exemplary level-table for levels 2–9;

FIG. 8 is a third exemplary backup schedule for a second alternative embodiment of the invention.

DETAILED DESCRIPTION

Figure 1:
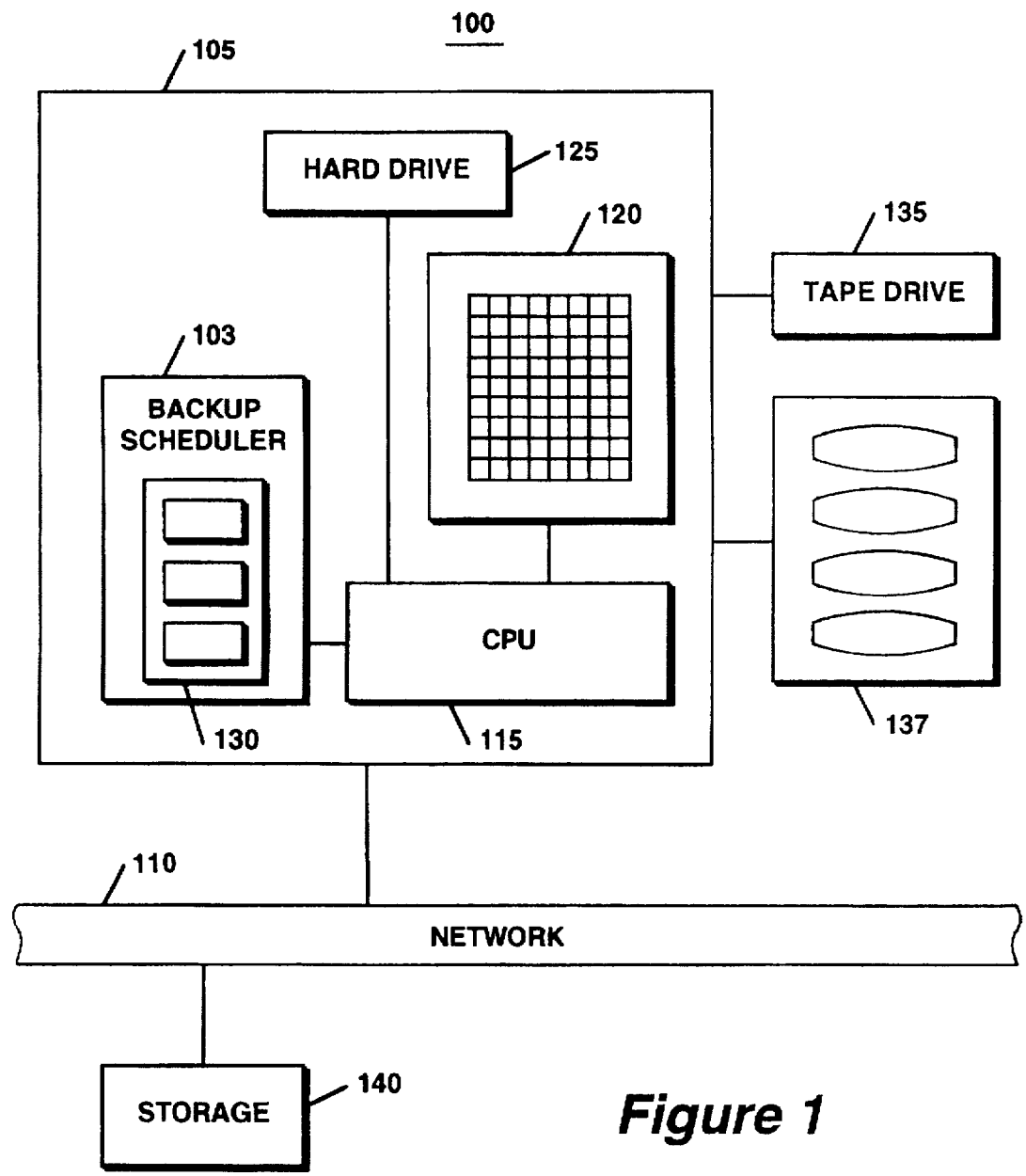
FIG. 1 is computer system having variable-level backup capability.

FIG. 1 shows a computer system 100 having a variable-level backup scheduler 103. The computer system 100 has a computer 105 connected to a network 110. The computer 105 has a CPU 115, a memory 120 and storage 125 such as a hard drive and the variable-level backup scheduler 103. The variable-level backup scheduler includes parameter tables 130. A tape drive 135 and an array of disks 137 are connected to the computer 105. Connected to the network 110 is a storage device 140.

Typically when a computer data system is backed up, the data stored on the system, in devices such as the hard drive 125 and the array of disks 137, is stored in a medium which can be preserved away from the computer system such as a computer tape produced in the tape drive 135. In the present embodiment of the invention, the save sets created during a backup may be stored on tape in the tape drive 135 or over the network onto the storage device 140. In alternative embodiments, many more devices, both computers and storage devices, could be connected to the network 110 and the backup apparatus 103 could control the backups of some or all of the devices on the network 110. It is also possible to connect to other networks where storage devices could reside.

The present embodiment of the invention employs a backup schedule where full and partial backups are scheduled at regular intervals. However, depending upon supplied parameters stored in the parameter tables 130, the scheduler 103 can determine that a level involving replication of less data can be performed, depending upon on the amount of unmodified data. The system administrator decides the parameters indicating that the normally scheduled backup is not necessary and some intermediate level of backup is more appropriate.

Figure 2:
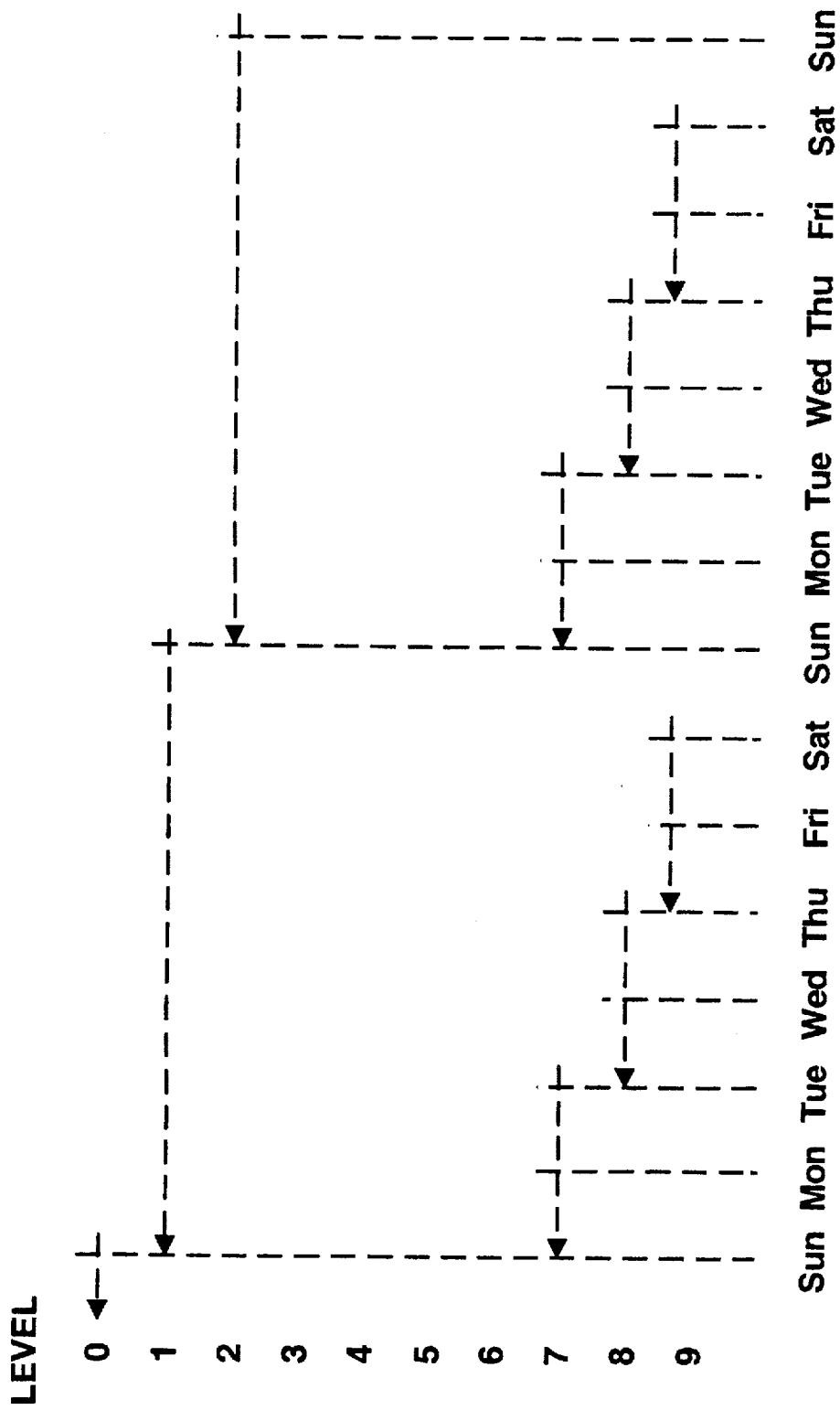
FIG. 2 shows the level of data backed up in full and partial level backups.

FIG. 2 illustrates full and partial level backups as they are used in operating systems such as the UNIX operating system. FIG. 2 shows the level of data backed up in a partial exemplary schedule for full and partial level backups. The level 0 backup on the first Sunday of the schedule backs up all data since the installation of the system. The level 7 backup on the first Monday backs up all data since the time of the most recent lower level, that is, since the level 0 backup on Sunday. The level 7 backup on the first Tuesday also backs up all data since the time of the most recent lower level, the level 0 backup on Sunday. The level 7 backup on Tuesday includes the data backed up in the level 7 backup on Monday effectively coalescing the data into a single save set. The level 8 backup on the first Wednesday backs up all data since the time of the most recent lower level, the level 7 backup on Tuesday. The backups continue in like manner until the second Sunday when a level 1 backup is performed which backs up all data since the time of the most recent lower level, the level 0 of the previous Sunday, which coalesces the save sets of the whole week into one level 1 save set.

In an exemplary backup schedule, shown in a table in FIG. 3, a full backup is made on the first Sunday of the month. On each succeeding Sunday for the next three weeks, a save of one higher-numbered level is made. All of the data modified during each week is saved and coalesced into one save set. During Monday through Saturday, no more than three save sets are added to the accumulation of save sets that are needed for system recovery. By the twenty-eighth day of the schedule, seven save sets are needed to perform a full recovery (levels 0, 1, 2, 3, 7, 8 and 9). If there is a fifth Sunday in the month, a level 4 backup will be taken, making eight save sets for a full recovery just before a full backup is made on the first Sunday of the next period.

In the above schedule, without the present invention of variable-level backup scheduling, a full backup is made on the first Sunday, regardless of how much data is unmodified since the previous full save set. The variable-level backup scheduler 103 makes decisions, based upon the tables of preselected parameters 130, about what level of save should be performed. The variable-level backup apparatus determines whether the originally scheduled level of save or a higher-numbered level involving less data should be performed.

The parameter tables 130 consist of a series of level-tables, one for each level in the backup schedule, with each level-table containing entries for that level and any other levels that it may invoke. The tables may be implemented in a variety of ways. Among the parameters which may be used are the percent of unmodified bytes of the total file system (pct), the number of unmodified bytes (nbytes), the age of the previous save set, and the next level save to perform. An exemplary level table for a backup level 0 is shown in FIG. 4.

Using the level table in FIG. 4, when a full (level 0) backup is scheduled, the previous level 0 save set must contain at least 50% unmodified data or 100 gigabytes (107,374,182,400 bytes) of unmodified data and be less than 1 year old (355 days) before a level 1 will be performed. Otherwise, a level 0 will be performed as scheduled. If the criteria are met, the next entry for level 1, dictates that the level will not be incremented any further and a level 1 backup will be made in place of the level 0 backup.

A second exemplary schedule is shown in FIG. 5. The only difference between the second exemplary schedule and the exemplary schedule shown in FIG. 3 is that the Sunday backup levels higher than zero have been incremented by one, leaving no scheduled level 1. Using the second exemplary schedule without implementing the variable-level backup scheduler will produce the same results as the first exemplary schedule. However, employing variable-level backup scheduling with the level table shown in FIG. 4 and similar level-tables results in a different and more efficient backup. The remaining level tables are shown in FIG. 6. The tables in FIG. 6 will result in the execution of the level already scheduled in the backup schedule. In the second exemplary backup schedule and the parameter tables from FIG. 4 and FIG. 6, only the level 0 backup will be affected by variable-level backup scheduling.

Figure 7:
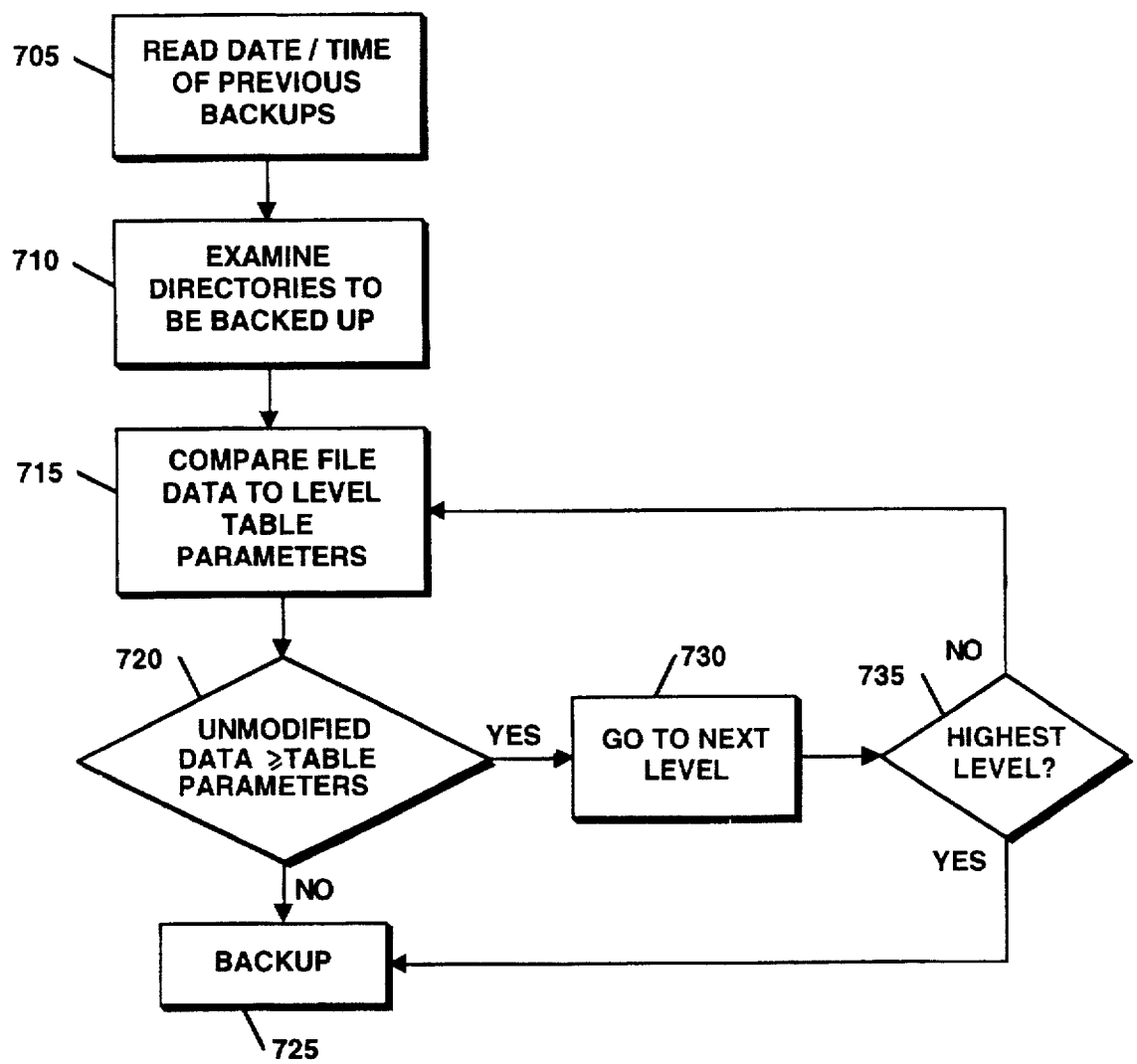
FIG. 7 is a flow chart of the variable-level backup scheduler.

The variable-level backup scheduling method is shown in the flow chart in FIG. 7. After reading in the information concerning the date and time of each previous level backup, block 705, the variable-level backup scheduler examines each directory of the file to be backed up, block 710, computing the number of bytes that are still unmodified in each level. The scheduler then compares the amount of file data to the parameters in the level tables, block 715. If the unmodified data is less the parameters in the tables for the scheduled level, decision block 720, the scheduler invokes a backup command at the scheduled level, block 725. If the unmodified data is greater than or equal to the parameters in the level table, decision block 720, the scheduler goes to the next level for further determination, block 730. If the next level is the highest level allowed in the particular point in the schedule, decision block 735, a backup at that level will be performed without further examination of the parameters, block 725. If it is not the predefined highest level, decision block 735, then the scheduler will repeat the step of comparing the file data with the parameters from the level tables for the new level, block 715. If the unmodified data is less than the parameters in the level table, decision block 720, a backup will be performed, block 725. If the unmodified data is greater than or equal to the parameters, decision block 720, the scheduler will move to the next level, block 730. The steps in comparing and determining whether a backup should be performed and moving to the next level will be repeated until the file data and parameters from the level tables determine the proper level of backup or until the predetermined highest level of backup is reached and then the determined backup will be performed.

It is possible that this example would result in one extra save set over the number of save sets which would result without using the present invention in order to do a full recovery of the computer system. However, if 50 percent of the data (or 100 gigabytes) remains unmodified for a year, that 50% or more of data will not be recopied for that year. At the same time, the levels 2–5 saves will never contain more data or take any longer than previously, i.e., they will always contain only one week's modifications.

However, if the level 0 save set reaches the specified level of fragmentation, the level 0 backup will be executed in its normal date/time slot, thereby defragmenting the save sets.

In a second alternative embodiment of the invention, levels 2–5 in the schedule of FIG. 5 could be changed to levels 3–6, and the level 0 level-table changed as shown in FIG. 8. At the cost of another extra save set, if at least 75 percent (or 150 gigabytes) of the data to be saved by a level 0 (at least 50 percent or 100 gigabytes on the previous level 0 and at least 25 percent or 50 gigabytes on the previous level 1) is contained on the previous levels 0 and 1 save sets, a level 2 backup will be performed to save the remainder rather than re-saving the large amount of unmodified data that is already backed up. Otherwise the appropriate level, either 0 or 1 depending upon the level-table criteria, will be performed. When there is no "previous level" save set, the backup level in the schedule is performed.

In the second alternative embodiment of the invention, there are at most 10 save sets needed to perform a full recovery, with either at least 75 percent of the data or at least 150 gigabytes of that data being contained in the first 2 save sets.

It is to be understood that the above-described embodiments are simply illustrative of the principles of the invention. Various and other modifications and changes may be made by those skilled in the art which will embody the principles of the invention and fall within the spirit and scope thereof. For instance, many variations may be made upon the backup schedule and the level-tables. The scheduler may be implemented in any type of operating system and in conjunction with other backup methods.

What is claimed is:

1. A method of backing up a computer system, comprising:
    establishing a plurality of backup level, each said backup level having an associated criteria for performing a backup of said backup level, and each said backup level having an established set of data to be written to a backup storage apparatus during performance of a backup at said backup level;
    establishing a schedule for performing backups, said schedule having a plurality of scheduled time when backup are performed, said schedule having a predetermined backup level for each said scheduled time;
    at each said scheduled time performing the steps of:
        i. testing said associated criteria against changes in data stored in the computer system; and,
        ii. performing a backup at a selected backup level by writing said established set of data to said backup storage apparatus, said selected backup level being said predetermined backup level unless said testing determines a higher level backup should be performed so as to thereby back up less data.

2. The method of claim 1 further comprising storing said associated criteria in a level-table.

3. The method of claim 1 wherein the step of testing said associated criteria further comprises:
    determining the amount of unmodified data in the computer system in response to date and time information from previous backups.

4. The method of claim 2 wherein the step of testing said associated criteria further comprises:
    comparing changes in data stored in the computer system with parameters in said level-table.

5. An apparatus to back up a computer system, comprising:
    means for establishing a plurality of backup levels, each said backup level having an associated criteria for performing a backup of said backup level, and each said backup level having an established set of data to be written to a backup storage apparatus during performance of a backup at said backup level;
    means for establishing a schedule for performing backups, said schedule having a plurality of scheduled times when backups are performed, said schedule having a predetermined backup level for each said scheduled time;
    means for testing said associated criteria against changes in data stored in the computer system; and,
    means for performing a backup at a selected backup level by writing said established set of data to said backup storage apparatus, said selected backup level being said predetermined backup level unless said testing determines a higher level backup should be performed so as to thereby back less data.

6. The apparatus of claim 5 wherein said associated criteria is a level-table.

7. The apparatus of claim 5 wherein said backup storage apparatus comprises a tape drive.

8. The apparatus of claim 5 wherein said backup storage apparatus comprises a storage device connected to the computer system across a network.

9. A method of backing up a computer system comprising the steps of:
    establishing a schedule for performing backups, said schedule having a plurality of scheduled times when backups are performed, said schedule having a predetermined backup level for each said scheduled time;

reading in date and time information from previous backups;

reading in a current backup level;

determining the amount of unmodified data in the computer system in response to the date and time information;

comparing the amount of unmodified data in the computer system to parameters in a level-table for a scheduled level according to said schedule;

invoking a backup command at the scheduled level if the amount of unmodified data is less than parameters in said level-table; and moving to a next backup level if the amount of unmodified data is not less than parameters in said level-table so as to thereby back up less data.

10. The method of claim 9 further comprising the steps of:

repeating the steps of comparing unmodified data and moving to a next backup level until a predefined highest level is reached; and, invoking the backup command at said predefined highest level.

11. The method of claim 9 further comprising the step of storing backed up data from the computer system on a computer tape.

12. The method of claim 9 further comprising the step of storing backed up data from the computer system on a storage device connected to the computer system by a network.

13. A variable-level scheduler for backing up data in a computer system, comprising:

means for reading in data concerning previous backups;

storage means for storing parameters for backup levels;

determining means for determining the amount of unmodified data in response to said data of previous backups;

comparing means for comparing the amount of unmodified data with said parameters;

means for establishing a schedule for performing backups, said schedule having a plurality of scheduled times when backups are performed, said schedule having a predetermined backup level for each said scheduled time; and, backup means for backing up data in the computer system at a selected backup level, said selected backup level being said predetermined backup level unless said comparing means results in a higher backup level so as to thereby back up less data.

14. The scheduler of claim 13 wherein said storage means comprises level-tables.

15. A method for backing up a computer system, comprising:

A. establishing a plurality of backup levels, each said backup level having an associated criteria, each said backup level having an established set of data to be written;

B. establishing a schedule, said schedule having scheduled times when backups are performed and predetermined backup levels included in said plurality of backup levels and corresponding to said scheduled times; and C. for performing a backup at each said scheduled time:
  i. testing criteria associated with the predetermined backup level for the scheduled time against the data stored in the computer system;
  ii. performing said backup at said scheduled time at said predetermined backup level unless said testing determines a higher level backup should be performed so as to thereby back up less data.

* * * * *